July 1, 1941.                 D. M. A. G. HAWES                 2,247,439
                              EMULSIFYING APPARATUS
                            Filed Oct. 27, 1938         2 Sheets-Sheet 1
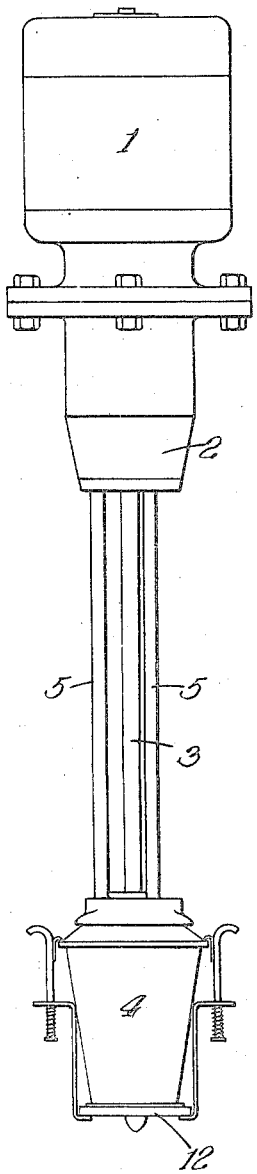
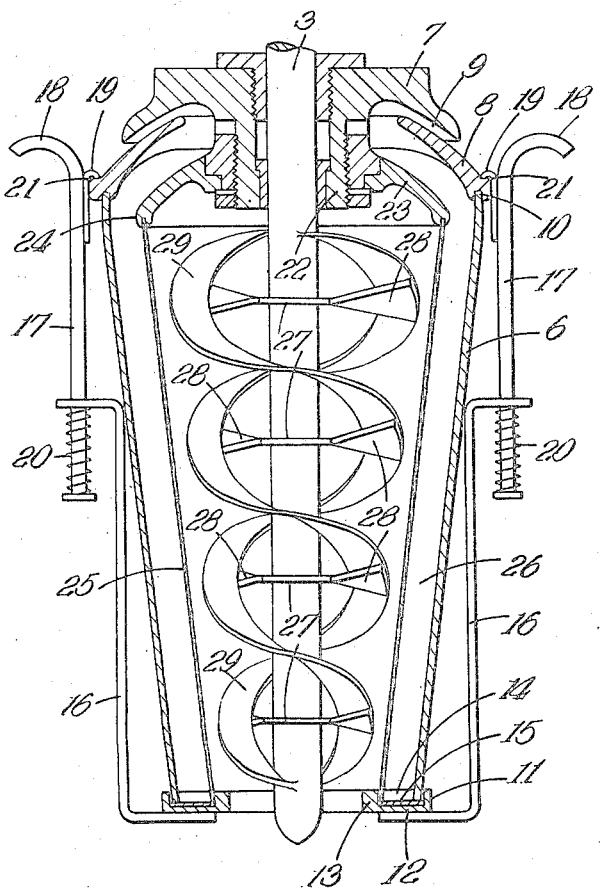
INVENTOR
David Marc Andrew Graham Hawes Deceased
By Florence Frances Hawes Executrix
BY Richard J. Cowling
ATTORNEY July 1, 1941.   D. M. A. G. HAWES   2,247,439
EMULSIFYING APPARATUS
Filed Oct. 27, 1938   2 Sheets-Sheet 2
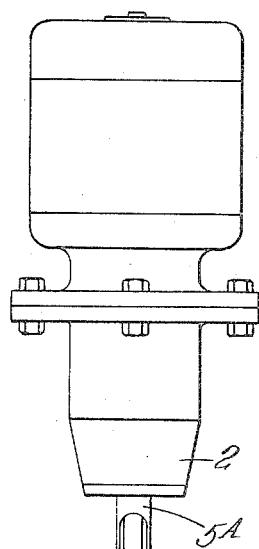
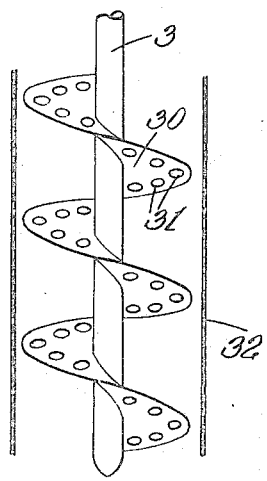
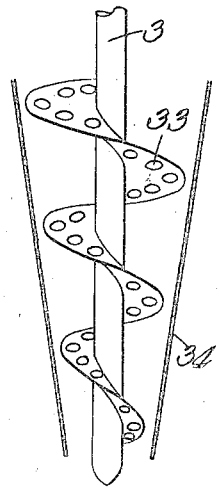
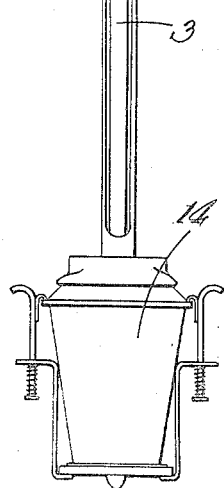
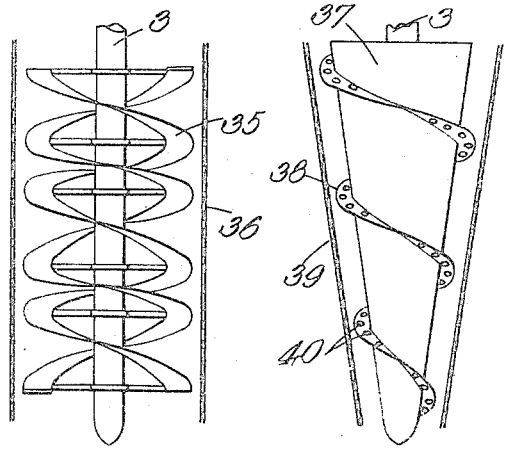
INVENTOR
David Marc Andrew Graham Hawes Deceased
By Florence Frances Hawes Executrix
BY Richard J Newling
ATTORNEY Patented July 1, 1941

2,247,439

UNITED STATES PATENT OFFICE 2,247,439

EMULSIFYING APPARATUS

David Marc Andrew Graham Hawes, deceased, late of Wimbledon, England, by Florence Frances Hawes, executrix, Wimbledon, England, assignor to Joe Lowe Food Products Company Limited, London, England, a British company Application October 27, 1938, Serial No. 237,215
In Great Britain October 30, 1937

5 Claims. (Cl. 259—97)

The present invention relates generally to an emulsifying apparatus, and it has particular relation to an apparatus of the portable type which may be moved readily from tank to tank and suspended therein for operation, thereby eliminating the necessity for handling or pumping the liquids from their respective tanks or through an emulsifying apparatus.

The invention is further concerned with a portable apparatus of the vertical type wherein a closed emulsifying chamber is provided at the lower end thereof for submergence in the body of liquid to be emulsified. This emulsifying chamber is divided into two concentric sections by means of a mesh or screen partition. The inner section is open at the bottom for receiving the liquid material to be emulsified, and has axially mounted therein propelling means of the elevating type. The outer section is open at the top adjacent its circumferential edges, and provided with outwardly and downwardly projecting discharge chutes.

In operation of the apparatus, the liquid material is received through the bottom opening, agitated and elevated by the propelling means whereby it is forced from the inner section through the screen partition into the outer section and out through the top discharge chutes, which are intended to be maintained above the liquid level in the container or tank within which the apparatus is being operated.

Heretofore the means for propelling the liquid to be emulsified has consisted of one or more propellers driven at high speed, which by centrifugal action and the effect of the rake and cutting edge of the blades of the propeller or propellers, causes the material to be disintegrated and forced through the screen, or mesh, into a passage from whence it may return to the remaining material undergoing treatment. Such apparatus is commonly provided with a prime-mover rigidly connected with the aid of a spacing tube or rods to a casing containing the emulsifier unit proper, and the emulsifier apparatus with its prime mover is, as a whole, lowered into a vat or pan containing the materials to be emulsified. The propeller (or propellers) is, in this case, located at the lower end of the emulsifier and is raked so as to drive the material through the surrounding screen upwardly into a common annular passage, from which the material escapes around the enclosing casing of the emulsifier head back to the material in the vat or pan.

It is found in practice that a propeller, or propellers, arranged in the manner indicated, does not produce sufficiently even dispersion of the material in the upward and tangential direction throughout the whole screen. The mesh or screen at its upper part becomes clogged and generally the efficiency of the apparatus is impeded.

It is the chief object of the present invention to overcome the disadvantages indicated.

Accordingly, there is provided emulsifying apparatus of the type referred to wherein the propelling means is formed as a feed worm.

In order that the said invention may be clearly understood and readily carried into effect, the same will now be more fully described with reference to the accompanying drawings, in which:

Figure 1 is a side elevation of an emulsifier built in accordance with the invention, Figure 2 is a section through the lower part of the apparatus shown in Figure 1, Figure 3 is a view similar to Figure 1, but illustrates a constructional modification more particularly applicable to smaller types of emulsifier apparatus in accordance with the invention, and Figures 4, 5, 6 and 7, show further details of constructional modifications.

Referring first to the construction illustrated in Figures 1 and 2, it will be seen that the emulsifier apparatus comprises a source of mechanical power such as an electric motor 1 having a flexible coupling 2 and an output shaft 3 which supplies mechanical energy to the emulsifier proper 4. Between the member 2 and the emulsifier unit 4 there are several rods 5 which act as fixed distance pieces. The apparatus as a whole may be suspended from flexible supports so that it may be lowered into the material that is to be emulsified. In Figure 2 there is shown a longitudinal section of the emulsifier unit 4 and it will be seen that the shaft 3 extends completely therethrough and is surrounded by a main outer casing 6. The distance rods 5 (not shown in Figure 2) support a top deflection plate 7, which carries a deflection plate 8. The latter is held in spaced relation from the plate 7 so that there is between the two plates an almost continuous passage 9. It will, of course, be understood that such passage cannot be completely continuous in its annular form, and that at intervals there must be integral or other connecting elements between the two plates. The outer casing 6 fits into an annular groove 10 provided on the lower edge of the annular plate 8 and it will be seen that the casing 6 tapers towards the lower end thereof and fits within a lip 11 formed around the periphery of an annular bottom plate 12.

The annular bottom plate 12 has a further lip 13 so that between the lips 11 and 13 there is an annular space or trough 14. A washer of rubber or other resilient material 15 is supported in the trough 13 and the lower end of the conical casing 6 is seated thereon. The underside of the bottom plate has secured to it a pair of strip brackets 16, each of which possesses a hook member 17 provided with a finger piece 18 and a hook portion 19. There are springs 20 which tend always to draw the hook members 17 as a whole downwardly, so that when the hook portions 19 thereof are engaged over a lip 21 formed upon the plate 8 the springs 20 hold the hook portions in the engaged position.

The upper plate 7 has a downwardly depending sleeve-like portion 22 which effectively carries a further deflection plate of annular construction 23. At its lower marginal edge the further deflection plate 23 is provided with an annular groove 24 which receives the upper end of a tapered, circular-section screen 25, the lower end of which is seated against the lip 13 of the lower plate 12, on the washer 15 thereof. The screen 25 is perforate and is substantially similar in shape to the casing 6 so that between such screen and the casing there is a substantially regular annular hollow 26. It will, incidentally, be observed that the hollow 26 is effectively continuous between the deflection plates 8 and 23 which are similarly spaced apart, and that there is finally an annular outlet 9 between the deflecting plates 7 and 8.

The centrally disposed shaft 3 has, at intervals along its length, fixed collars 27 which support radially disposed arms 28. The latter support spiral strips 29 which in effect constitute the two-start flights of a spiral worm.

When the apparatus described is in operation, the lower end of the emulsifier unit, shown in Figures 1 and 2, is allowed to depend into the liquid or the like to be emulsified. The shaft 3 is rotated by the motor 1 in such direction that the flights of the two-start worm constituted by the strips 29 pick up the material to be emulsified and force it through the screen 25. It is important to adjust the speed of the emulsifier apparatus so that there is a nice balance between the upward translational movement of the substance undergoing emulsification, due to the pitch of the worm, and the tangential motion of such substance due to the centrifugal force brought about by the angular movement of the worm. After the substance has passed through the screen 25 it rises in the annular passage 26 and finally passes through the passage 9 and flows down over the sides of the outer casing 6 and back into the main body of liquid being emulsified.

Figure 3 shows a modified form of an emulsifying apparatus made in accordance with this invention, which is primarily intended to be made in the smaller sizes, and it will be observed that in this instance the connection between the flexible coupling 2 and the emulsifier unit 4 is obtained with the aid of a hollow tube 5A, in which there is located the driving shaft 3. The hollow tube 5A takes the place of the distance rods 5 shown in Figure 1.

Figure 4 shows diagrammatically a constructional modification in which the shaft 3 supports a single-start worm flight 30 having perforations 31. In this case the worm is helical in form, and the perforated screen 32 is of plane cylindrical shape.

In Figure 5 there is shown another modified construction wherein the worm 33 is made spiral and the screen 34 associated therewith has the form of a truncated cone.

In the construction shown in Figure 6 the shaft 3 carries a solid conical portion 37 around which there is disposed helically the worm flight 38. The screen 39 is shaped in general conformity with the outline of the conical member 37. In this instance the worm flight is shown as having perforations 40. The construction illustrated in Figure 6 will be found more convenient in the smaller sizes of emulsifier apparatus made in accordance with the invention.

In Figure 7 there is shown a double-start worm 35 associated with a plane cylindrical screen 36, the worm 35 in this modification being similar in form to that shown in Figure 2 except that it is not generally tapered downwardly.

It will be apparent that the inverted truncated conical shape of the emulsifier 4, and the increasing diameters of the spiders or arms 28, which support the increasing spirals 29, result in increasing the peripheral speeds of the spirals 29 at their points of maximum diameters. This construction, therefore, imparts increased emulsifying efficiency to the apparatus by applying greater forces to the liquid materials being emulsified at the top of the emulsifying chamber 4 than at the bottom thereof. It is a well understood physical principle that the finer the reduced globular size the greater is the force or power required to further reduce said globular size in an emulsification process. The apparatus herein described gives this increased power at the top of the emulsifying chamber 4 where it acts to further reduce the size of the globules first reduced in the lower part of the chamber, thereby providing increased emulsification efficiently in a manner not possible in the ordinary cylindrical chamber.

Although I have only described in detail several embodiments of the invention, it will be apparent to those skilled in the art that the invention is not so limited, but that various other modifications may be made therein without departing from the spirit thereof or from the scope of the appended claims.

What I claim and desire to secure by Letters Patent of the United States is:

1. In a portable emulsifying apparatus of the character described, in combination, a driving mechanism, a driving shaft depending therefrom, and an emulsifying chamber mounted adjacent the lower end of said driving shaft, said emulsifying chamber being divided into a plurality of concentric sections by a perforated partition, said chamber having an axial opening in the bottom thereof connected only with said inner section, continuous helical means sinuously mounted on the end of said driving shaft extending within said inner section for agitating and elevating the liquid material therein and forcing it through said partition into the outer section, the space between said helical means and said driving shaft increasing upwardly of the driving shaft and helical means, said outer section having a plurality of circumferential discharge openings adjacent its top for the escape of the liquid material forced therein by said helical means.

2. In a portable emulsifying apparatus of the character described, in combination, a driving mechanism, a driving shaft depending therefrom, and an emulsifying chamber of inverted truncated conical shape mounted adjacent the lower end of said driving shaft, said emulsifying chamber being divided into two concentric sections by a screen partition, said chamber having a central opening in the bottom thereof connected only to said inner section, continuous sinuous means spirally mounted on the lower end of the drive shaft extending into said inner section for agitating and elevating the liquid material therein and forcing it through said screen partition into the outer section, the space between said continuous sinuous means and said driving shaft increasing upwardly of the driving shaft and the continuous sinuous means, said outer section having a circumferential discharge chute extending downwardly from its top for discharging the liquid material therefrom at a level above the level from which it entered the emulsifying chamber.

3. In a portable emulsifying apparatus of the character described, in combination, a driving mechanism, a driving shaft depending therefrom, and an emulsifying chamber of inverted truncated conical shape mounted adjacent the lower end of said driving shaft on fixed spaced rods secured to said driving mechanism, said emulsifying chamber being divided into two sections by a perforated partition of inverted truncated conical shape of less diameter than said chamber, said chamber having an axial opening in the bottom thereof connected only with said inner section, continuous spiral means having spaced spirals of increasing diameters as they approach the top of said section mounted on the end of said driving shaft extending therein for agitating and elevating the liquid material therein and forcing it through said partition into the outer section, said outer section having a circumferential discharge opening adjacent its top for the escape of the liquid material forced therein by said spiral means.

4. In a portable emulsifying apparatus of the character described, in combination, a driving mechanism, a driving shaft depending therefrom, and an emulsifying chamber of inverted truncated conical shape mounted adjacent the lower end of said driving shaft, said emulsifying chamber being divided into two concentric sections by a perforated partition of cylindrical shape, said chamber having a central opening in the bottom thereof connected only to said inner section, spiral propelling means mounted in spaced relation on outwardly extending arms of increasing lengths on the lower end of the drive shaft extending into said inner section for agitating and elevating the liquid material therein and forcing it through said screen partition into the outer section, said outer section having a circumferential discharge chute extending downwardly from its top for discharging the liquid material therefrom at a level above the level from which it entered the emulsifying chamber.

5. In a portable emulsifying apparatus of the character described, in combination, a driving mechanism, a driving shaft depending therefrom, and an emulsifying chamber of inverted truncated conical shape mounted adjacent the lower end of said driving shaft on fixed spaced rods secured to said driving mechanism, said emulsifying chamber being divided into two sections by a screen partition of inverted truncated conical shape of less width than said chamber, said chamber having an axial opening in the bottom thereof connected only with said inner section, propelling means including a plurality of spaced continuous spiral blades mounted in an interwoven arrangement on the end of said driving shaft extending within said inner section for agitating and elevating the liquid material therein and forcing it through said partition into the outer section, said blades being mounted on arms of increasing lengths in spaced relation to said drive shaft, said outer section having a circumferential discharge chute extending downwardly from its top for discharging the liquid material therefrom at a level above the level from which it entered the emulsifying chamber.

FLORENCE FRANCES HAWES,
*Executrix of the Estate of David Marc Andrew Graham Hawes, Deceased.*